United States Patent Office 3,032,054
Patented May 1, 1962

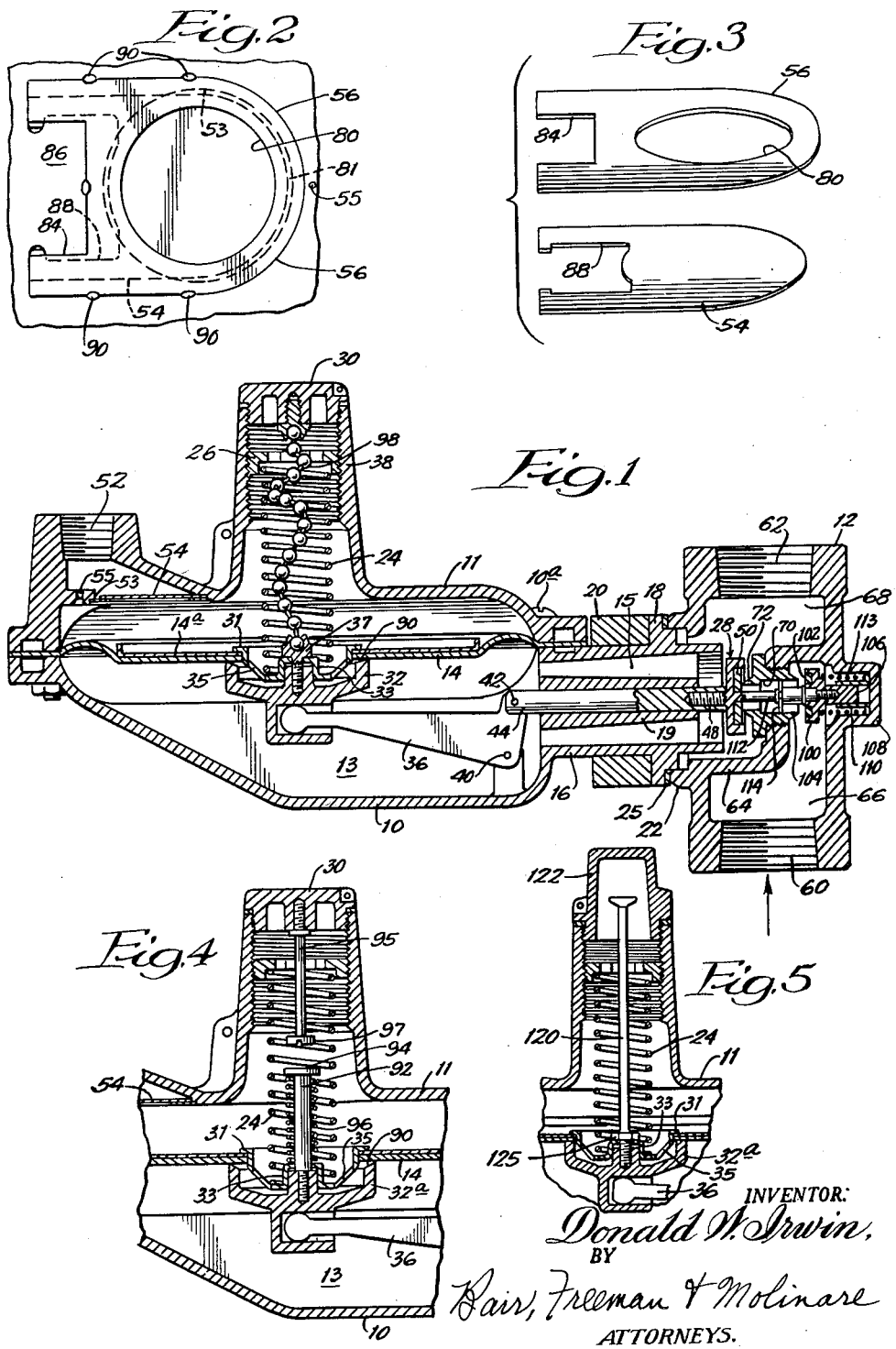

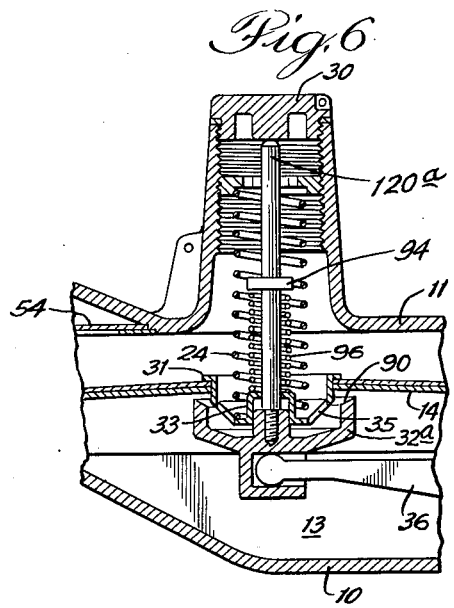

3,032,054
PRESSURE REGULATOR CONSTRUCTION
Donald W. Irwin, Marshalltown, Iowa, assignor to Fisher Governor Company, Marshalltown, Iowa, a corporation of Iowa
Filed Apr. 13, 1959, Ser. No. 805,768
2 Claims. (Cl. 137—116.5)

This invention relates to a pressure regulating valve which is particularly adapted for use in gas lines to provide gas under constant reduced pressure from a high pressure supply line. The present application is a continuation-in-part of my copending application Serial No. 522,585, filed July 18, 1955, now Patent No. 2,895,501. Such regulators are used primarily for natural gas, but are suitable for pressure regulation of most fluids. One common use for the regulating valve of the invention is for reducing the gas main pressure to lower pressure required for appliances in residences, such as stoves, water heaters, furnaces and the like.

The regulating valve is of the spring biased diaphragm type. As the demand on the downstream side of the valve is increased, the pressure in the diaphragm cavity is reduced, thus causing the diaphragm to move downwardly (when positioned with the bonnet up) under the influence of the spring. The downward movement of the diaphragm actuates means to open the valve to permit greater volumes of gas to flow therethrough, thus meeting the increased demand at the desired pressure. The valve remains open to the extent required to meet the demand as long as the demand continues. Upon reduction in demand, as for example when one of the appliances is shut off, the pressure on the downstream side tends to increase, causing the diaphragm to move upwardly against the force of the spring, thus closing the valve to the extent required to meet the reduced demand and while maintaining substantially constant pressure.

One object of the present invention is to provide an improved venting construction for emergency operation when the lever or the valve disc fail to operate and release the full line pressure on the downstream side of the valve.

A further object is to provide a pressure regulating valve of basic construction in which the diaphragm is modified to include an internal relief valve which opens upon build up of dangerously high pressures on the downstream or demand side.

Another object of the invention is to provide a regulating valve which is reliable in operation, simple in construction and which may be easily assembled and adjusted to provide substantially constant pressure on the downstream side.

These and other objects and advantages will become apparent from the following description when read in conjunction with the accompanying drawings, in which:

FIGURE 1 is a sectional view through a pressure regulating valve constructed in accordance with the invention;

FIGURE 2 is a plan view of the relief valve for the diaphragm bonnet;

FIGURE 3 is an exploded view showing perspectively the component parts of the relief valve of FIGURE 2;

FIGURE 4 is a sectional view of the bonnet portion of the diaphragm housing showing the emergency relief valve of the invention;

FIGURE 5 is a sectional view similar to FIGURE 4 but of reduced size, showing a modification of the emergency valve actuating means; and FIGURE 6 is a sectional view similar to FIGURE 4 showing a modified form in which the stem 92 and pin 95 are combined into a single member, and the diaphragm is lifted from the seat 90 for purposes of relieving pressure within the chamber 13.

Referring now to the drawings, the valve consists of a diaphragm body member or housing 10 having a shallow, generally circular cavity 13 therein which connects with the valve housing 12 through a conduit or hub portion 16. The conduit 16 may be cast integrally with the body member 10 from any suitable metal, such as aluminum. The valve housing 12 has a threaded inlet opening 60 and a threaded outlet opening 62 through which the gas flows. The opening 60 connects to the supply pipe or source of gas at high pressure and the opening 62 is similarly engaged with the pipe which connects to the demand. The valve housing is divided into two chambers—66 on the upstream side and 68 on the downstream side—by means of a web 64. The web contains an opening 70 which is adapted to be opened and closed by means of a valve member, as explained hereinbelow.

The diaphragm body member 10 has a bonnet 11 which is fixed to the flange of the body by means of a plurality of circumferentially spaced bolts 10a. A flexible diaphragm 14 is sandwiched and clamped between the body and the bonnet. The diaphragm is made from a rubberlike material which may be reinforced with fabric or other suitable flexible material responsive to change in fluid pressure within the body. The central portion of the diaphragm is reinforced by means of a rigid disc 14a. The connecting conduit 16 has a circumferentially extending flange or shoulder 18 which is brought into sealing engagement with the cooperating gasket 25 and the flange 22 on the valve housing by means of machine screws (not shown) which screw into the split collar 20 that bears against the flange 18. The conduit 16 has a central bearing 19 disposed by means of a web within the opening 15, through which opening the chamber 68 of the valve housing 12 communicates with the cavity 13. A valve stem 44 is adapted to slide within the bearing to open the valve member 28 within housing 12, as indicated below.

The diaphragm 14 is urged downwardly (when in the position shown in FIGURE 1) by means of the compressed coil spring 24, which bears against a spider 35 clamped by means of flange 31 to the marginal edge of a central opening through the diaphragm 14 and supporting disc 14a. The spider 35 has a hollow boss 33 for holding the end of the spring 24. A cup-shaped bell crank receiver 32 is fixed to the spider 35 and the diaphragm 14, 14a by means of a screw 37 extending through the boss, and contains a socket or slot in its outer end opening laterally to the cavity 13 into which the rounded end of a bell crank 36 extends. The other end of the bell crank 36 has two spaced pivots 40 and 42, pin 40 being fixed to a support projecting from the body member and the pin 42 connecting to the end of the valve stem 44 which is slidably disposed within the sleeve or bearing 19. The movement of the diaphragm 14 due to variation of pressure within the cavity 13 moves the receiver 32 to actuate the bell crank 36 to open and close the valve.

The tubular portion 38 of the bonnet 11 encloses the spring 24 and is internally threaded to take an adjusting screw 26 adapted to apply varying pressure on the spring 24, thus allowing the gas pressure on the downstream side of the valve to be varied as desired. The more the spring is compressed, the greater will be the pressure required in the cavity 13 to counterbalance it. A suitable plug 30 may be provided to close off the tubular portion of the bonnet.

Referring now to the valve housing 12, the opening 70 through the web has a seat 72 terminating in a tapered edge which is adapted to engage the resilient disc 50 seated within the cup-shaped head of the valve member 28. In the construction illustrated, the opening 70 comprises part of an insert which screws into the threaded opening in web 64. If desired, the seat 72 may be formed integrally with the web. The valve member 28 has a threaded stud 48 projecting normally therefrom which is adapted to screw into a tapped opening in the end of the stem 44 which permits the valve disc to be replaced should it become worn or damaged. The valve disc 50 is made from a resilient material, such as synthetic rubber or a plastic substance, which is resistant to the particular gases which will flow through the pressure regulating valve. The disc 50 must form a gas-tight seal when it bears against the tapered edge of the seat 72.

It will be noted that the bonnet also carries an integral vent connection 52 which communicates with the interior of the bonnet through opening 53 in the top of the bonnet. The connection is internally threaded to permit connecting with a vent pipe. As best shown in FIGURES 2 and 3, the vent opening 53 has a cover plate 56 which fits into a marginal recess surrounding the opening. The plate 56 is provided with a central opening 80. One end of the plate has a rather large square recess 84 adapted to accommodate a projection 86 cast integrally with the bonnet wall. The flapper or hinged portion of the valve consists of thin spring metal plate or disc 54 having a pair of narrow legs 88 which are fixed to the wall of the bonnet and serve as leaf springs normally to urge the disc 54 into contact with the plate 56 to cover the opening 80. The disc 54 is larger in diameter than the opening 80 but smaller than the opening 53. The plate 56 is secured in the recess by peening over the marginal edge of the bonnet wall, as indicated at 90. The flapper disc 54, of course, lies on the outside of the plate 56.

As shown in FIGURES 2 and 3, there is a small opening 55 provided through the bonet wall into the vent connection. This opening permits air to pass to and from the bonnet to prevent any chattering or hunting. Due to the spring action of the legs 88, the flapper portion of the valve opens only when it is necessary to permit volumes of pressurized air or gas to escape rapidly from the bonnet.

In operation, the valve housing 12 is connected to a source of high pressure gas at the connection 60. The demand line, to be supplied with gas at constant reduced pressure, is connected to the opposite side 62. The gas is adapted to flow through the inlet chamber 66, up through the opening 70 in the web 64, into the chamber 68, and out through the pipe leading to the demand through the threaded opening 62. To regulate the pressure of gas on the demand side so that it remains constant regardless of the volume being used, the screw 26 in the tubular portion of the bonnet 38 is turned down to adjust the force exerted by the spring against the diaphragm. The extent of compression of the spring 24 determines the pressure of the downstream gas.

It will be apparent that if there is a sudden increase in pressure on the downstream side of the valve, as for example when the gas supply to a large appliance is cut off abruptly, there will be a surge causing sudden increased pressure in the diaphragm cavity. This causes the diaphragm to be deflected against the compression of spring 24 and, consequently, the air within the bonnet is compressed. To take care of the sudden surge and prevent damage to the diaphragm, the flapper 54 opens and permits the compressed gas to escape rapidly. Slight fluctuations in pressure are vented through the small opening 55. The venting of gases from the bonnet prevents excessive demand pressures due to rapidly changing flows of the regulated media. This dual purpose relief valve is very simple in construction and effective in quickly venting small or large volumes of gas.

In order to put the valve into operation after the valve head 100 has been seated, I have provided a chain 98 connected to the combination bell crank receiver and valve 32a at one end and to the cap 30 at the other end. By removing the cap 30, the chain 98 may be pulled upwardly, which lowers the valve 28 thus lifting the valve 100 from its seat as valve 28 bears against the stud 112. Once the gas has started to flow, equilibrium conditions are effected and the safety valve continues to remain open until such time as the pressure on the supply line fails or the flow becomes excessive in the demand piping.

The chain 98 is also useful for manipulating the valve seat 50 in the event that foreign materials become lodged between the disc and the seat.

FIGURE 4 shows a most important feature of my invention, namely, the relief valve construction which is adapted to offer relief in the event that high pressures are encountered and the valve disc for some reason or another is not able to seat. For example, the lever 36 or its connecting pins might fail in which case pressure against the underside of the diaphragm 14 would not be effective to close the valve 28; or the failure might be due to complete loss of the valve disc. In such circumstances it is necessary to make some provision to prevent the high pressure gas from flowing into the demand line and exerting its full pressure on appliances connected thereto. The necessary relief is provided by the bell crank receiver 32a which has a tapered seat 90 adapted to seal against the lower surface of the diaphragm 14. The spider member 35 is not secured to the bell crank receiver but is adapted to slide with the diaphragm 14, 14a up and down the stem 92 which screws into a tapped opening in the center of the member 32a. The stem 92 has a head 94 beneath which a coil spring 96 is compressed, the spring bearing against the spider 35 at its lower end. A pin 95, secured at its upper end to the cap 30, is aligned with the stem 92 and is adapted to bear against the head 94 so that in the event of complete failure of any of the internal parts of the regulator, the diaphragm 14 will rise sufficiently to bring the head 94 to bear on the pin. As excess pressure in the diaphragm cavity continues to lift the diaphragm, the spring 96 is compressed and the valve 32a is separated from its seat. Gas in the cavity 13 then may escape from the cavity into the bonnet and to the atmosphere through the flapper valve 53 and vent fitting 52. Thus, by screwing the stem 92 into the combination bell crank receiver and valve 32a, and securing the pin 95 to the cap 30, the construction of FIGURE 1 may be modified to incorporate a pressure relief valve.

To illustrate the operation of this relief valve, let us assume that an obstruction is holding the main valve 28 open. Under such circumstances, regardless of how much the pressure increases within the diaphragm cavity 13, the valve will not close. When the pressure builds up to a predetermined amount, governed by the compression resistance of the spring 96, the diaphragm 14 lifts off of the valve seat 90, compressing the spring 96. The gas escapes from cavity 13 through the openings in the spider 35 as previously indicated.

The construction shown in FIGURE 5 has a stem 120 screwed into the bell crank receiver 32a and a modified cap 122. The spider 35 may be secured to the crank receiver by means of nut 125. By removing the cap 122 the valve 28 may be actuated by the stem to facilitate removal of foreign material that may have lodged beneath the seat 50. In FIGURE 6 the construction of FIGURE 4 has been modified to substitute a single integral pin 120a for the pin 95 and the stem 92. Hence, this construction will operate like the one of FIGURE 4 under excess pressure in the cavity 13. The stem 120a bears against the underside of cap 30 as the diaphragm lifts and prevents the crank receiver and its valve seat 90 from lifting with it. As the seat 90 separates from the diaphragm, as shown in FIGURE 6, the excess pressure in the cavity is relieved through the valve 54.

It will be obvious to those skilled in the art that changes may be made in the construction of the various elements and their relationship one to the other without departing from the true spirit and scope of my invention as pointed out in the appended claims. It is, therefore, not my intention to limit the invention to the specific forms shown and described other than as necessitated by the scope of the claims.

What I claim as new and desire to secure by Letters Patent of the United States is:

1. A pressure regulating valve comprising a diaphragm body having a cavity therein, a bonnet constituting a cover for said cavity and having a tubular portion projecting therefrom, a vent in said bonnet communicating with the atmosphere, a flexible diaphragm clamped between said body and said bonnet having a stiffened central portion with an opening therethrough, a spring in the tubular portion of said bonnet and bearing against said diaphragm, a valve housing having an inlet chamber and an outlet chamber communicating with said cavity, a first valve member mounted in said valve housing for regulating fluid flow between said inlet and outlet chambers, a second valve member disposed in said cavity and biased in contact with the margin of said diaphragm surrounding said opening for movement therewith, a valve actuating lever mounted on said diaphragm body and pivotally connected at each end to said second valve member and said first valve member for movement of said latter valve member in response to movement of the diaphragm whereby, upon failure of said first valve member to close, excess pressure built up within said cavity overcomes the bias of said second valve member to separate said second valve member from said diaphragm margin and vent said pressure from said cavity to said bonnet and out said vent, means connected to said second valve member for arresting movement of said second valve member when said diaphragm moves a predetermined distance into said bonnet due to failure of actuating means between said first and second valve members, whereupon pressure within said cavity in excess of said biasing force will lift said diaphragm from said second valve member to vent said pressure from said cavity to said bonnet and out said vent.

2. The valve member of claim 1 in which said arresting means constitutes a stud projecting from said second valve member through said opening in the diaphragm and into said bonnet, and stop means within said tubular portion adapted to abut the end of said stud when the diaphragm moves through said predetermined distance.

References Cited in the file of this patent

UNITED STATES PATENTS

| | | |
|---|---|---|
| 1,669,889 | Andrews | May 15, 1928 |
| 2,115,259 | Goldkamp | Apr. 26, 1938 |
| 2,252,152 | Work | Aug. 12, 1941 |
| 2,306,746 | Niesemann | Dec. 29, 1942 |
| 2,543,203 | Roney | Feb. 27, 1951 |
| 2,698,026 | Roberts | Dec. 28, 1954 |
| 2,729,236 | Valince | Jan. 3, 1956 |
| 2,742,028 | Robinson | Apr. 17, 1956 |
| 2,744,387 | Reed | May 8, 1956 |
| 2,879,790 | Ey | Mar. 31, 1959 |

FOREIGN PATENTS

| | | |
|---|---|---|
| 120,958 | Australia | Feb. 6, 1946 |